March 23, 1954
A. W. BLYTHE
2,673,084
COIL SPRING BOOSTER
Filed July 8, 1952
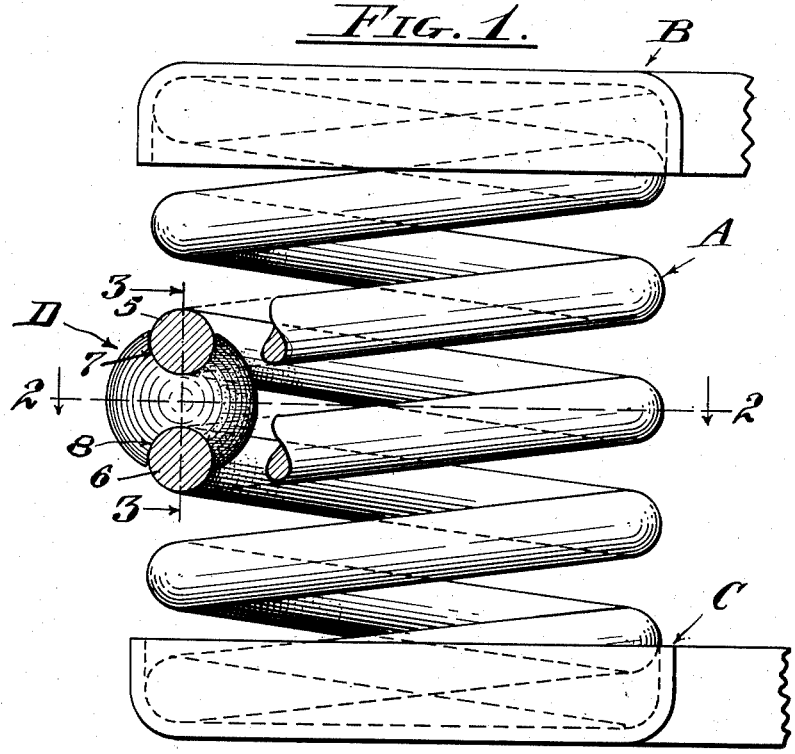
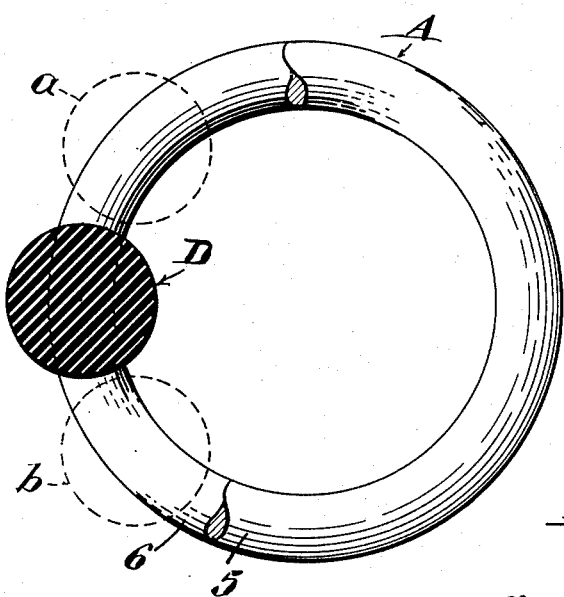
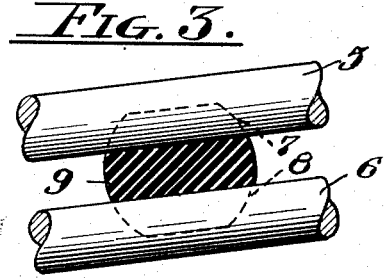
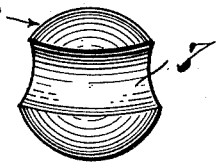
Inventor
Allen W. Blythe;
By R. S. Berry
Attorney Patented Mar. 23, 1954

2,673,084

UNITED STATES PATENT OFFICE 2,673,084

COIL SPRING BOOSTER

Allen W. Blythe, South Gate, Calif., assignor of one-third to Edward Granville and one-third to Louis E. Sprague, both of Los Angeles, Calif.

Application July 8, 1952, Serial No. 297,678

4 Claims. (Cl. 267—33)

This invention relates to a booster for coil springs and has as its primary object the provision of a means for eliminating the sag of coil springs particularly where employed between the frame and axles of motor vehicles so as to remedy faulty conditions developed by such sag and to restore the springs to normal operation after having become set in a distorted position.

Another object is to provide a booster for the coil springs of motor vehicles whereby the body of the vehicle may be raised relative to the vehicle axles to factory required height, and whereby vehicle shock absorbers displaced by sag of coil springs may be restored to normal operating position.

Another object is to provide a means for stabilizing coil springs on the front or rear portions of a motor vehicle in such manner as to eliminate excessive bouncing of the vehicle wheels when traversing rough roads which bouncing causes an undesirable unbalanced condition.

Another object is to provide a means for yieldably opposing compression of the outer side portions only of vehicle coil springs so as to reduce swaying or leaning of vehicle bodies when traversing curves thereby keeping the vehicle on evener keel.

Another object is to provide an attachment for coil springs which is particularly serviceable in eliminating the sag of coil springs employed on the front end of a motor vehicle, which sag is known to cause mis-alignment of the front wheels of the vehicle resulting in excessive tire wear, hard steering, and poor tracking.

A further object is to provide a coil spring booster comprising a body of hard but resilient material, such as vulcanized rubber or synthetic rubber, which body is adapted to be inserted between contiguous convolutions of a spring in seated engagement with fractional portions of the lengths thereof, and which body is adapted to yieldably spread apart the convolutions engaged thereby.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in elevation partly in section of a coil spring as mounted between the frame and the axle of a motor vehicle, showing the booster as applied;

Fig. 2 is a view in horizontal section partly in plan as seen on the line 2—2 of Fig. 1;

Fig. 3 is a view in section and elevation taken on the line 3—3 of Fig. 1; and

Fig. 4 is a plan view of the booster as detached.

Referring to the drawing more specifically A indicates a coil spring here shown as comprising a heavy duty type of coil spring employed in motor vehicles where the spring is arranged vertically and is interposed between the frame and axle of the vehicle with its upper end seated in an inverted pocket B on the vehicle frame and with its lower end seated in a pocket C carried on the vehicle axle. In some motor vehicles a pair of such springs are employed only on the front axle with a spring disposed adjacent each end of the axle and the forward end portions of the side members of the vehicle frame, while other vehicles are also equipped with a pair of the coil springs interposed between the end portions of the rear axle and the rear end portions of the vehicle frame.

In carrying out the invention, the coil spring A is equipped with a booster D which is interposed between adjacent convolutions 5—6 of the spring at a point where weakness or sag of the spring is indicated or where it is found desirable to fortify or stabilize a portion of the spring. In the coil springs of vehicles the weakened portion or sag of the spring, or the portion thereof that requires stabilizing or boosting is ordinarily the outer side portion of the spring which is generally subjected to more frequent or more forceful compressions than the inner side portions thereof. The booster D is therefore designed to extend longitudinally of the spring convolutions along only a fractional portion thereof so as to oppose relative compression of adjacent convolutions along only a short length thereof where a single booster is employed; it being contemplated to apply two or more of the boosters as indicated in dotted lines $a$ and $b$ in Fig. 2 where a greater spread of the boosting action is required.

The booster D is formed of hard but resilient material such as vulcanized rubber or synthetic rubber, and may be generally spherical in shape as here shown or may of any other general contour since its particular configuration is not essential other than that its upper and lower portions be contoured to provide opposed channels 7—8 to receive and afford seats for the spring convolutions 5—6; the channels being curved longitudinally to conform to the lengthwise curvature of the spring coils and being of a depth and cross-sectional contour as afford a seat for and to conform to the portions of the coils engaged therein and whereby the booster when interposed between the coils will be securely held in place.

The intermediate body portion 9 of the booster extending between the inner or bottom portions of the channels 7—8 is dimensioned to have a height slightly exceeding the normal distance between adjacent convolutions of the spring to which the booster is to be applied; and is sufficiently resistant to compression that when the booster is interposed between the spring convolutions the latter will be slightly tensioned so as to tightly grip the booster and securely hold it in place. The booster is also sufficiently resistant to compression that where the spring is sagged the booster will act when in place in the sagged portion of the spring to spread the adjacent convolutions to their normal relative position, or even slightly beyond such position if need be, and to so hold the convolutions under a load imposed thereon, thereby stabilizing the spring and compensating for weakness or sag therein at the portions thereof to which the booster is applied.

In applying the booster to a spring the convolutions of the spring between which the booster is to be positioned are spread apart by means of a suitable tool to permit insertion of the booster.

In the operation of the invention the booster will manifestly act to yieldably oppose relative movement toward each other of the adjacent coils of the spring engaging the booster, thereby strengthening the spring and effecting a stiffening action thereon at the point or points of application of the booster.

I claim:

1. The combination with a coil spring of a block of solid resilient material having a resiliency approximating that of vulcanized rubber and interposed between adjacent convolutions of the spring and extending along a small portion only of the length of said convolutions; said block having a thickness slightly exceeding the space between the convolutions abutted thereby to have a spreading action thereon.

2. The combination with a coil spring, of a block of solid resilient material having a resiliency approximating that of vulcanized rubber and positioned between adjacent convolutions of a coil spring in abutting engagement therewith, said block having a length such as to extend along the abutting convolutions only a small portion of the length of said convolutions.

3. The combination with a coil spring of a block of solid resilient material having a resiliency approximating that of vulcanized rubber and positioned between adjacent convolutions of the spring for preventing or rectifying distortional sag of said spring in one direction, the length of said block being small as compared to the length of said convolutions and having spring convolution-receiving seats providing spring-embracing side walls, the spacement of said seats slightly exceeding the normal spacement of the convolutions of the spring to which said block is to be applied, said seat side walls tapering outwardly to increased thickness from the outer ends thereof, said block having a stress-absorbing bulged out portion at each side between said spring convolution seats, said bulged out portions in part formed by said seat walls, and the pressure of spring convolutions in said seats causing the walls thereof to embrace the convolutions.

4. The combination with a coil spring of a block of solid resilient material having a resiliency approximating that of vulcanized rubber positioned between adjacent convolutions of the spring for preventing or rectifying distortional sag of said spring in one direction, the length of said block being small as compared to the length of said convolutions and having top and bottom spring convolution supporting portions of a width exceeding the width of said convolutions, the spacement of said bearing portions slightly exceeding the normal spacement of the convolutions of the spring to which said block is to be applied, said block bulging to increased width and downwardly at each side between said convolution bearing portions for stress absorbing function, and the pressure of spring convolutions on said bearing portions causing the latter to at least partially embrace contiguous spring convolution portions.

ALLEN W. BLYTHE.

References Cited in the file of this patent

UNITED STATES PATENTS

| Number | Name | Date |
|--------|------|------|
| 316,306 | Sterne | Apr. 21, 1885 |
| 1,566,026 | Leipert et al. | Dec. 15, 1925 |
| 1,679,698 | Weydert | Aug. 7, 1928 |
| 2,230,340 | Shreffler | Feb. 4, 1941 |
| 2,621,918 | Tapp | Dec. 16, 1952 |

FOREIGN PATENTS

| Number | Country | Date |
|--------|---------|------|
| 497,051 | Great Britain | Dec. 12, 1938 |